Aug. 21, 1951  F. LYIJYNEN  2,565,248
MOLDING APPARATUS AND METHOD
Filed April 17, 1946  7 Sheets-Sheet 1

INVENTOR.
Fred Lyijynen.
BY
Elmer Jamison Gray
ATTORNEY.

Aug. 21, 1951 F. LYIJYNEN 2,565,248
MOLDING APPARATUS AND METHOD
Filed April 17, 1946 7 Sheets-Sheet 2

INVENTOR.
Fred Lyijynen.
BY
Elmer Jamison Gray
ATTORNEY.

Aug. 21, 1951        F. LYIJYNEN        2,565,248

MOLDING APPARATUS AND METHOD

Filed April 17, 1946        7 Sheets-Sheet 3

INVENTOR.
Fred Lyijynen.
BY
Elmer Jamison Gray
ATTORNEY.

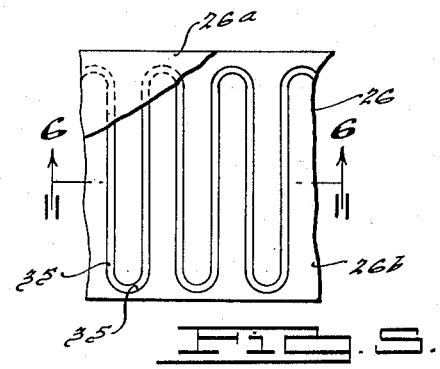
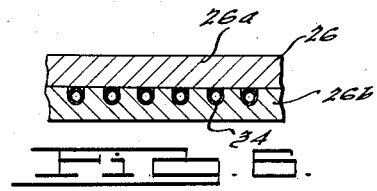
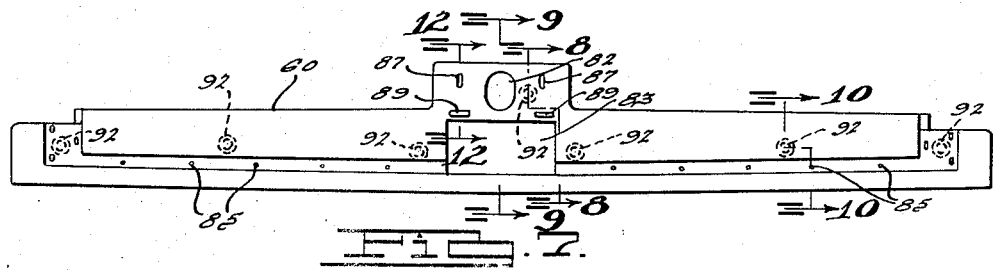

Aug. 21, 1951  F. LYIJYNEN  2,565,248
MOLDING APPARATUS AND METHOD
Filed April 17, 1946  7 Sheets-Sheet 5

INVENTOR.
Fred Lyijynen.
BY
Elmer Jamieson Gray
ATTORNEY.

Aug. 21, 1951 F. LYIJYNEN 2,565,248
MOLDING APPARATUS AND METHOD
Filed April 17, 1946 7 Sheets-Sheet 6
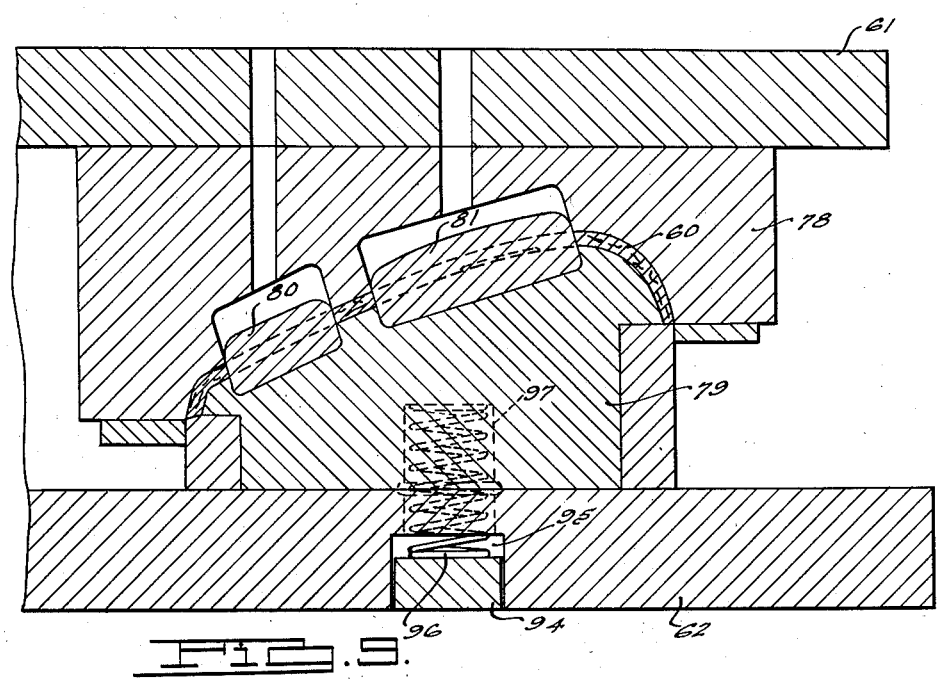
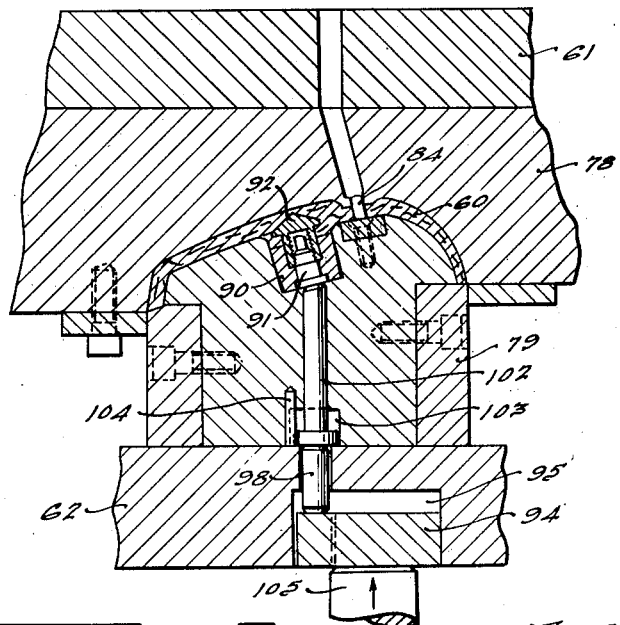
INVENTOR.
Fred Lyijynen.
BY
Elmer Jamison Gray
ATTORNEY.

INVENTOR.
Fred Lyijynen.
BY
Elmer Johnson Gray
ATTORNEY

Patented Aug. 21, 1951

2,565,248

UNITED STATES PATENT OFFICE 2,565,248

MOLDING APPARATUS AND METHOD

Fred Lyijynen, Detroit, Mich., assignor to Briggs Manufacturing Company, Detroit, Mich., a corporation of Michigan Application April 17, 1946, Serial No. 662,840

10 Claims. (Cl. 18—16)

This invention relates to the manufacture of plastic articles and more particularly to improvements in methods and apparatus for molding or forming under heat and pressure plastic materials, such as thermoplastic or thermosetting resinous compositions, which require the application of heat thereto during the molding or pressing operation in order to carry forward and complete the reaction or polymerization thereof.

The present invention is particularly useful in connection with the molding under heat and pressure of irregularly shaped articles, such as instrument panels and trim panels applicable to the interiors of automobile bodies, and has for an important object the provision of mechanism of improved nature for molding or forming the panels rapidly and efficiently on a volume basis thereby reducing costs materially and increasing the productive capacity of each press used in carrying out the molding operations.

The molding of articles from resinous plastic materials is customarily accomplished by means of upper and lower heated dies or mold members in a press, usually hydraulically operated. In practice it is necessary to maintain the press closed for a substantial interval of time in order to bring the plastic charge in the mold up to temperature and thereafter to hold the charge at the desired temperature in order to complete the reaction or curing of the resinous constitutents of the charge. This curing operation is usually conducted in two stages with a short breathing period therebetween when the mold is opened slightly to permit the escape of gases. During the molding period the press is completely idle, and in accordance with conventional practice the operators who serve the press are also idle during this period. Moreover, it is usual for the press to remain open and also idle during the period of time that the mold is being charged by the operators outside the press. When taking into consideration the high cost of hydraulic presses used for these purposes, the cost of maintenance thereof, the long periods of idleness of the presses and operators while waiting for the plastic materials to progress through the reaction stages, it will be apparent that production costs of the plastic articles are greatly enhanced on account of these conditions.

It is an object of the invention to provide a method and apparatus by which the foregoing objectionable conditions may be ameliorated and the periods of idleness of the press during the molding or pressing operations measurably reduced thereby decreasing production costs with a consequent large increase in the output capacity of the press.

A further object of the invention is to provide an improved apparatus for molding plastic articles by means of which a plurality of molds may be introduced in superimposed relation into the press from two opposite sides thereof while a plurality of molds are at the same time being charged outside of the press at the other two sides thereof, and after a pluraltiy of articles have been formed in the molds within the press these may be simultaneously withdrawn and the charged molds introduced into the press in superimposed relation for a succeeding operation. Thus, in accordance with the invention any desired number of articles may be formed within superimposed molds in the press during the time required to charge a similar number of molds outside the press, and as a consequence a minimum of lost time results permitting the productive capacity of the press to be increased as much as three or four fold.

Another object of the invention is to provide improved means for shifting or feeding pairs of molds sequentially into and out of the press from all four sides thereof with the molds of each pair disposed one above the other when fed into the press, improved means being provided for exerting closing pressure on the molds while at the same time transmitting through the top and bottom of each mold heat sufficient to complete the reaction or curing of the plastic charges therein.

Still another object of the invention is to provide an improved mold having an upper hinged section which, when closed down onto the lower mold section, is capable of yielding movement or articulation so as to conform automatically to changing contours of the charge within the mold and to ensure accurate mating of the mold sections when brought together.

A further object of the invention is to provide improved means for opening the mold sections, for ejecting the finished articles from the molds when opened outside the press, and also, where desired, for molding fastener elements into the article through the medium of which the finished article may later be readily attached to its supporting structure.

Other objects of this invention will appear in the following description and appended claims, reference being had to the accompanying drawings forming a part of this specification wherein like reference characters designate corresponding parts in the several views.

Fig. 5 is a fragmentary section taken substantially through lines 5—5 of Fig. 4 looking in the direction of the arrows.

Fig. 6 is a section taken through lines 6—6 of Fig. 5 looking in the direction of the arrows.

Fig. 7 is a top plan view of an instrument panel for an automobile body which is produced in accordance with the present embodiment of the invention.

Fig. 9 is an enlarged fragmentary section taken through any one of the mold units substantially along lines 9—9 of Fig. 7 when the panel therein shown is positioned within the mold unit.

Fig. 10 is an enlarged fragmentary section taken through any one of the mold units substantially along lines 10—10 of Fig. 7 when the panel therein shown is positioned within the mold unit.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 3:
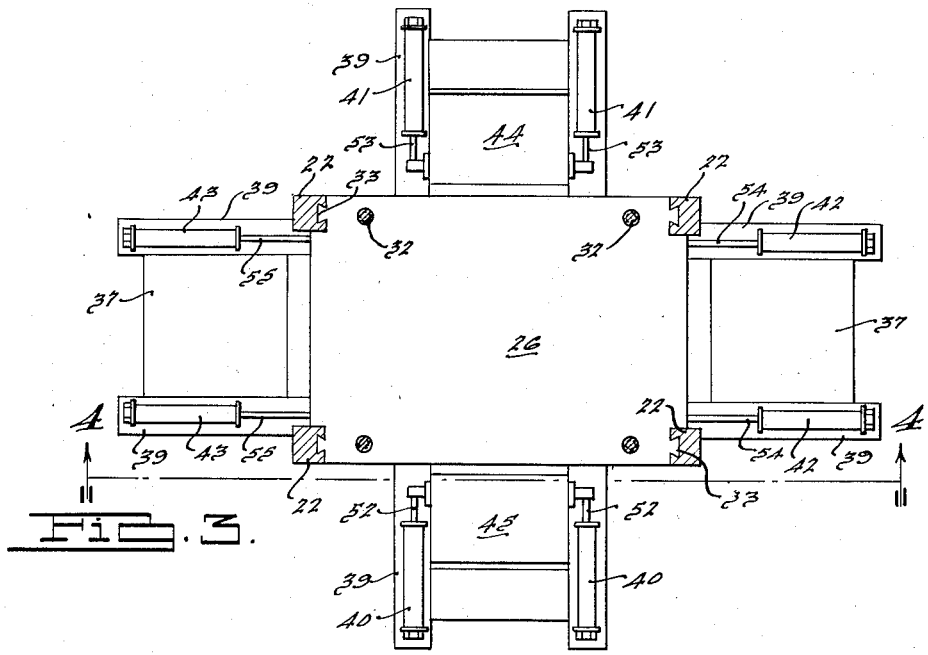
Fig. 3 is an upper plan view, largely diagrammatic, illustrating the manner in which the mold units are fed in pairs into and out of the press at all four sides thereof.
Figure 4:
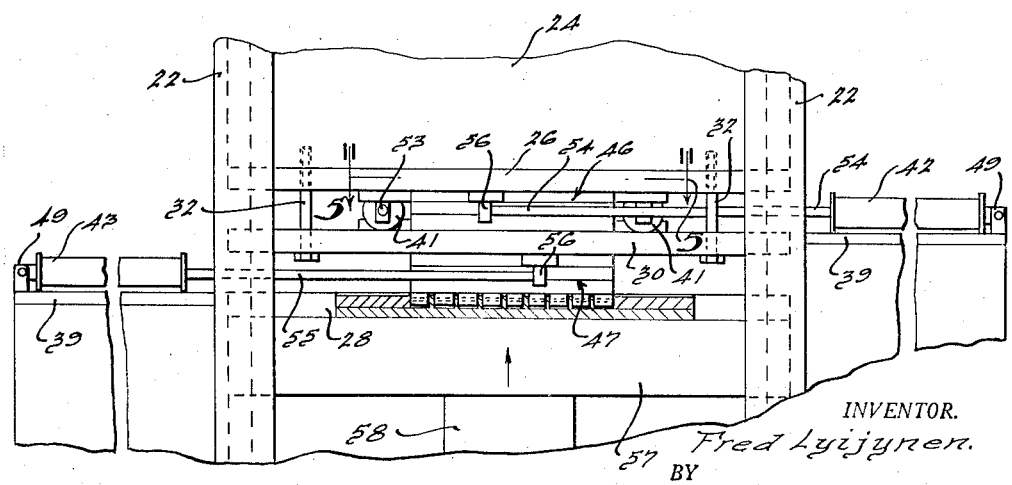
Fig. 4 is a fragmentary vertical section, somewhat enlarged and taken substantially through lines 4—4 of Fig. 3 looking in the direction of the arrows, this view also being largely diagrammatic.

In carrying out the present invention I utilize a press, preferably of the hydraulic type, which is constructed so as to be open at all four sides to permit the mold units to be fed into and out of the press from all sides thereof. The press in the present instance has a fixed upper cross-head carrying a stationary platen and a hydraulically operated vertical reciprocable bottom ram. The press is provided at each side thereof exteriorly of the centrally located ram with a bottom housing frame 20 or enclosure within which are contained various operating and control mechanisms, including the pneumatic means for actuating the various air cylinders as well as the automatic controls therefor. The frame of the press also comprises four upright frame members or columns 22 which support a fixed upper cross-head 24. Rigidly attached to the bottom of this cross-head is an upper fixed heated platen 26. As illustrated in Fig. 4 the press is provided with a lower vertically slidable heated platen 28. Arranged between the platens 26 and 28 is an intermediate vertically slidable heated platen 30. Secured within tapped holes in the bottom of the cross-head 24 adjacent the four corners of the fixed platen 26 are four depending hanger bolts 32 which extend freely through holes in the platen 30 and serve not only as guiding means therefor but also as means for supporting the platen 30 on the heads of the bolts in the lowermost position of the platen. The platens 28 and 30 may be guided on the frame in any suitable manner, such as by means of vertically extending dovetail projections or splines slidable in correspondingly shaped grooves or guideways 33 in the uprights 22, see Fig. 3.

Since the mold mechanism is utilized for the purpose of molding plastic materials under heat and pressure the platens 26, 28 and 30 are heated by suitable means and maintained at the proper temperature in order to plasticize the materials and complete the curing or reacting thereof. One suitable means for heating the platens is illustrated in Figs. 5 and 6 in connection with the uper platen 26, it being understood that the platens 28 and 30 may be heated in the same manner. The platen 26 comprises two superimposed flat sections or plates 26a and 26b. The upper surface of the lower plate 26b is formed with a continuous zig-zag or serpentine groove 34 within which is housed a correspondingly shaped steam pipe 35 through which steam flows for the purpose of heating the upper plate 26a to the required temperature. It will be understood that any other suitable means may be employed for heating the several platens.

Mounted on the frame housing 20 at each side of the press is a main platform or table 37 carrying sets of anti-friction rollers 38 over which the mold unit is shiftable into and out of loading position. Each of the guide platforms 37 is provided at opposite sides with platform extensions 39 adapted to support a pair of pneumatic cylinders. As shown in Figs. 1 to 4 inclusive the platform extensions 39 support opposed pairs of pneumatic cylinders 40, 41, 42 and 43 at the four sides of the press. Slidable on the anti-friction rollers 38, carried by each of the four guide platforms 37, are four mold units 44, 45, 46 and 47. The mold unit 44 at the rear side of the press is arranged on a level higher than the mold unit 45 at the front side of the press, and the mold unit 46, see Fig. 4, is in corresponding manner arranged at a higher level than the mold unit 47. With this construction it is possible to feed two mold units into the press from opposite sides thereof while the two remaining mold units are withdrawn from the press at the two remaining sides thereof. In order to guide the mold units into and out of the press it will be therefore understood that the guide platforms 37 with their anti-friction rollers 38 are arranged at correspondingly different levels, as shown for example in Fig. 4. In this latter figure it will be seen that the mold unit 46 has been fed into the press between the heated platens 26 and 30, and the mold unit 47 has been fed into the press at a lower level between the heated platens 28 and 30. When these mold units are withdrawn from the press the other two mold units 44 and 45 are fed into the press in the same manner at different levels. The tables 37 may be provided with suitable side guides 48 in order to guide the molds into their proper positions within the press. Other side guides may also be provided on the platens in order to control the accurate positioning of the mold units when fed into and out of the press.

Each pneumatic cylinder 40–43 is formed at its outer end with a boss 49 carrying a horizontal pivot pin journalled within a pair of spaced lugs 50 secured to a block 51 rigidly mounted on the platform extension 39. This construction provides a swivel mounting for the outer end of each of the pneumatic cylinders enabling it to swing vertically about a horizontal axis in order to compensate for vertical movement of the mold units during operation of the press. The pneumatic cylinders 40–43 are provided respectively with piston rods 52, 53, 54 and 55 which in the usual manner are attached to reciprocable pistons within the cylinders. The outer end of each piston rod has a suitable articulated connection with a projecting lug or bracket 56 at one side of one of the mold units. As a result of this construction the mold units may be fed in straight line paths into and out of the press upon operation of the pneumatic mechanism to shift the piston rods 52–55 into and out of the press.

The bottom heated platen 28 is mounted upon and secured to a ram 57 guided in suitable manner on the frame and reciprocated in a vertical direction through the medium of a hydraulically actuated piston rod 58.

In the illustrated embodiment of the invention each mold unit is designed to form a single article, such as an instrument panel 60. It will be understood, however, that a wide variety of articles may be molded and each mold unit may be constructed to mold one or a plurality of similar or different articles. The plastic materials which I use preferably are composed of one or more thermosetting resins as the principal constituent thereof which may be combined with a suitable reinforcing filler of fibrous nature. Typical thermosetting resins which have been used satisfactorily are the phenol-formaldehyde, urea formaldehyde and melamine type resins.

Each of the mold units 44–47 is identical in the present embodiment of the invention and is particularly illustrated in Figs. 8 to 12 inclusive. As therein illustrated each mold unit comprises an upper mold section 61 and a lower mold section 62. The upper section 61 is provided at the inner end thereof at its opposite sides with a pair of depending hinge members 63, each member having a sliding fit within a bifurcated or vertically slotted hinge member 64 rigidly secured to the inner end of the lower mold section 62, see Fig. 8. Each mating pair of hinge members 63 and 64 is connected together by means of a transverse hinge pin 65 secured to the hinge member 63 and slidable within vertical guide slots 66 in the hinge member 64. In advance of each pair of hinge members is an equalizer pin or plunger 67 engageable at its upper end with the bottom of the mold section 61. Each plunger 67 is slidable vertically within a guide hole in a block 68 and terminates in a head 69 slidable within a cylindrical hole 70 in the block. The plunger is urged upwardly by means of a compression spring 71 which is bottomed within a hole 72 in the mold section 62.

Rigidly secured to the lower mold section 62 at opposite sides thereof and in advance of the hinged ends of the mold section are a pair of locating studs 73 terminating in rounded reduced ends 73a engageable within socket members 74 secured within holes in blocks 75 rigidly attached to the bottom of the mold section 61. Thus, when the mold section 61 is swung to closed position the socket members 74 will fit over the guide portions 73a of the locating studs 73 and accurately position the mold section when the mold is closed. Adjacent each locating stud 73 is a vertically reciprocable pneumatically actuated plunger 76 which passes freely through a hole in the lower mold section 62 and engages a bearing block 77 secured to the bottom of the upper mold section 61. After the mold has been withdrawn from the press to the position shown in Fig. 1 the plungers 76 are shifted upwardly thereby swinging the mold section 61 about its hinge connection into open position so as to permit removal of the molded article 60. It will be understood that the plungers 76 are connected at their lower ends beneath the platforms 37 to pneumatically operated pistons reciprocable within air cylinders (not shown).

Figure 12:
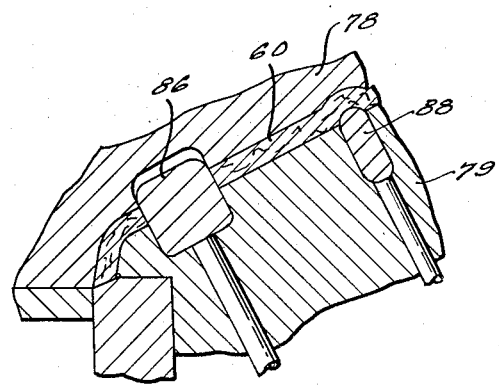
Fig. 12 is an enlarged fragmentary section taken through any one of the mold units substantially along lines 12—12 of Fig. 7 when the panel therein shown is positioned within the mold unit.

In the present embodiment of the invention, see particularly Figs. 8 to 10 and 12, each mold unit comprises an upper die or mold member 78 rigidly secured to the underside of the platen 61. The mold also comprises a lower sectional die 79 secured to the lower platen 62. The dies 78 and 79 are suitably contoured so as to mold the plastic charge to the shape of the article 60. As shown in Fig. 9 the lower die 79 carries fixed punch inserts 80 and 81 adapted to project into recesses in the upper die and to pierce or punch out openings 82 and 83 (Fig. 7) in the panel 60. As shown in Fig. 10 the lower die 79 also carries a number of fixed punches 84, ten in the present instance, which are adapted to punch a series of ten holes 85 in the instrument panel 60. The lower die 79, as shown in Fig. 12, also carries two fixed punches 86 which are adapted to pierce two slots 87 in the instrument panel. Also carried by the lower die are two fixed embossing inserts 88 (see Fig. 12) adapted to form embossments 89 in the instrument panel.

Figure 8:
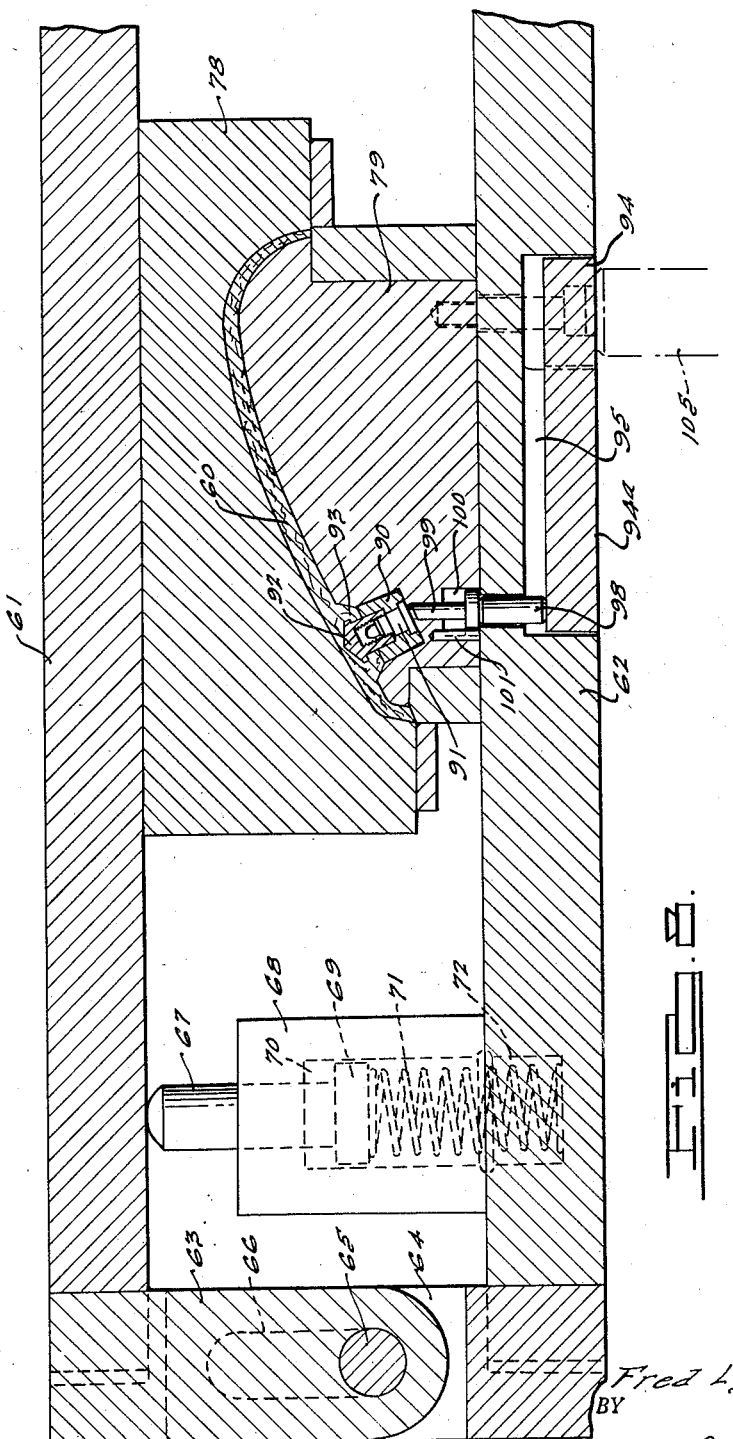
Fig. 8 is an enlarged fragmentary section taken through any one of the mold units substantially along lines 8—8 of Fig. 7 when the panel therein shown is positioned within the mold unit.
Figure 11:
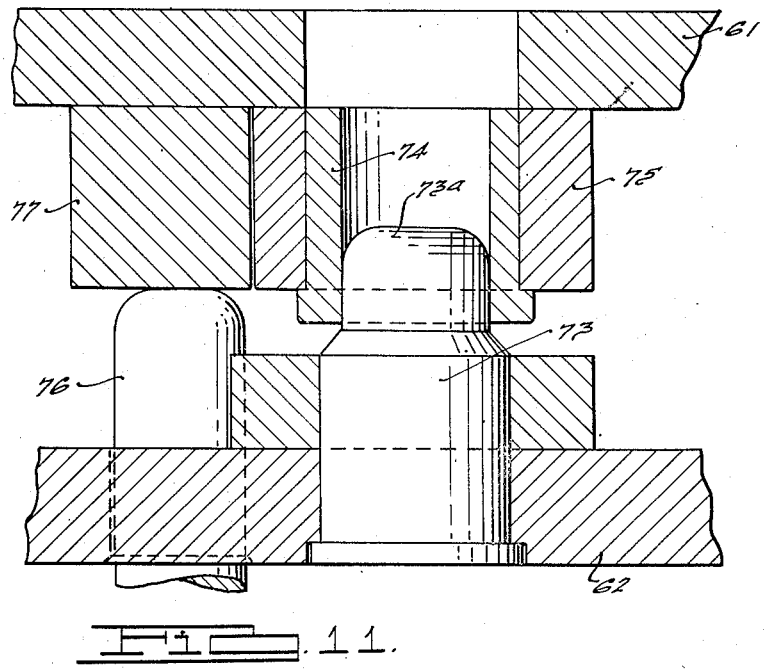
Fig. 11 is an enlarged fragmentary section taken through any one of the mold units at the locality of the pneumatic means for opening the mold.

In the present embodiment of the invention the mold mechanism is constructed so as to mold into the underside of the panel 60 a number of fastener elements which are placed in position on the lower die before the charge of plastic material in the form of a plurality of superimposed sheets is placed over the die preparatory to the closing of the mold unit. As shown in Figs. 8 and 10 a number of metallic socket inserts 90, seven in number in the present embodiment, are mounted in recesses in the lower die 79. Secured within each of these inserts is a locating stud 91, the outer end of which is shaped to receive and position a fastener element 92. As illustrated, each fastener element is formed with a head and a cylindrical shank provided with a threaded hole into which the end of the locating stud 91 projects when the fastener element is placed in position. During the molding operation an upwardly projecting portion of each fastener element is molded therein and embedded in a thickened or embossed portion 93 at the underside of the panel and when the panel is removed after completion of the molding operation a portion of the fastener element 92 will project below the panel. Any suitable number of fastener elements 92 may be molded into the underside of the panel 60, these elements being suitably located so as to receive attaching screws when the panel is mounted on the automobile body frame structure.

Figure 1:
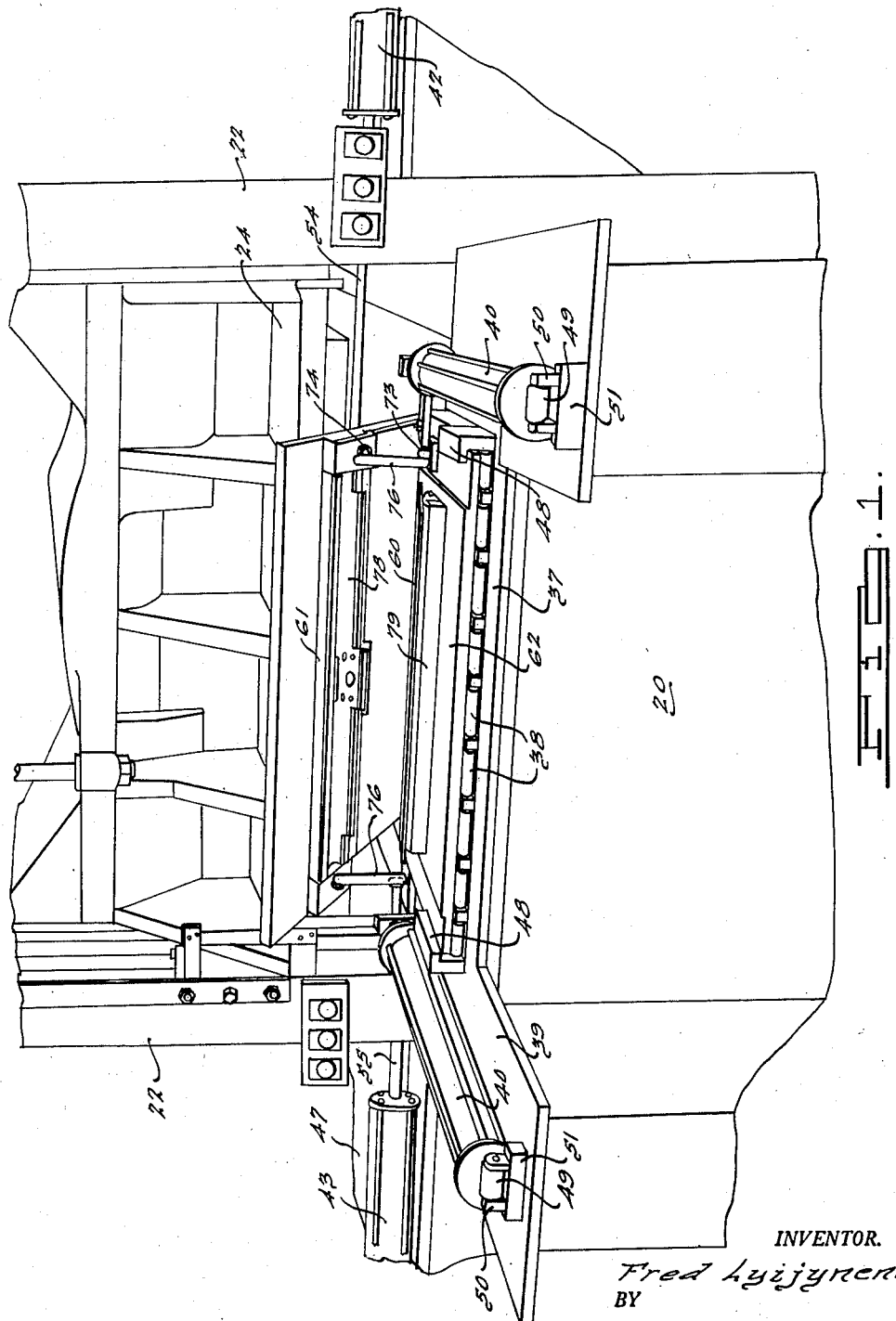
Fig. 1 is a fragmentary perspective view of a press embodying the present invention, illustrating at one open side of the press a mold unit in retracted position and open for the purpose of charging the same.
Figure 2:
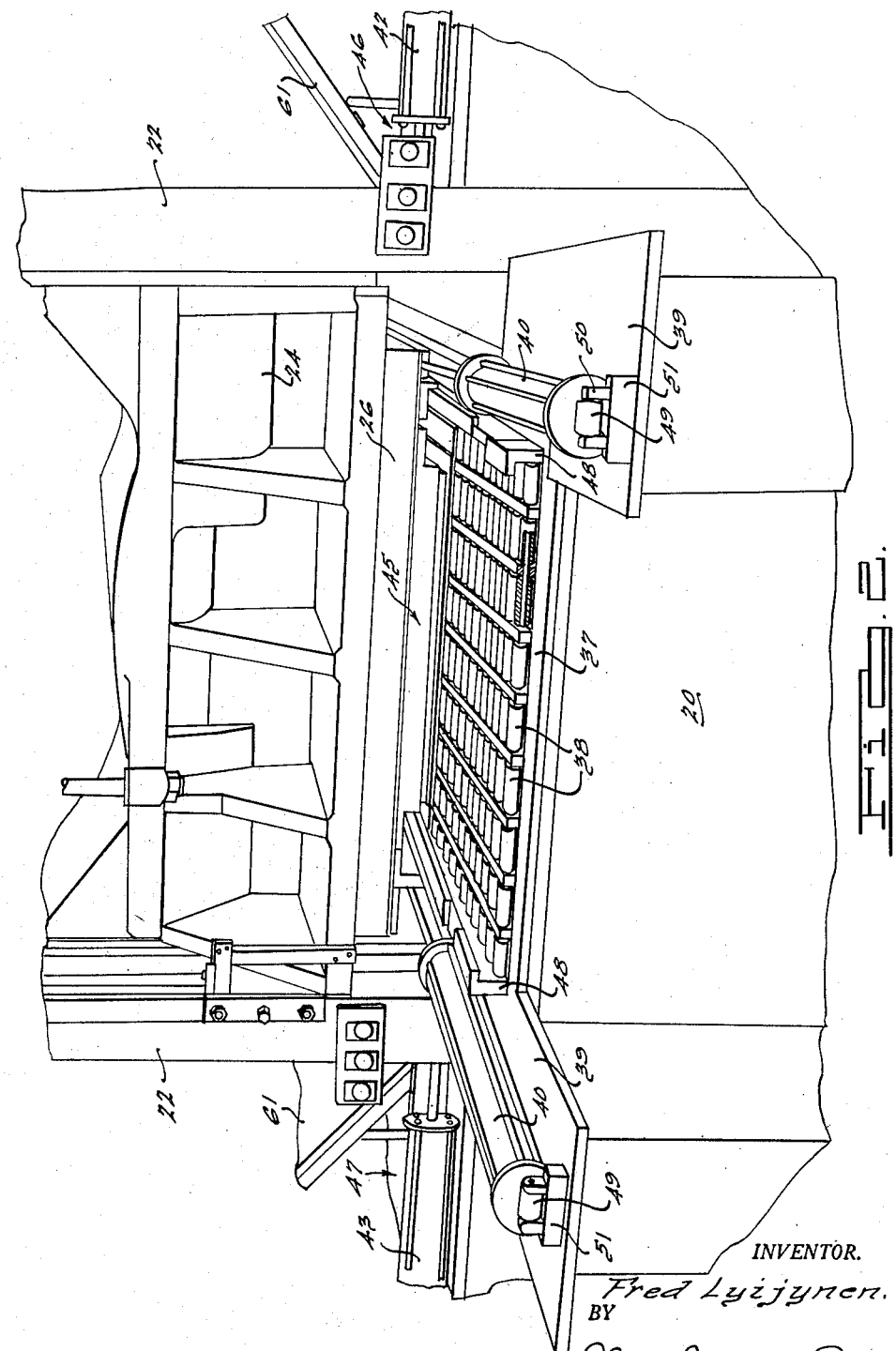
Fig. 2 is a view generally similar to Fig. 1, illustrating the mold unit of Fig. 1 in operative position within the press.

As illustrated in Figs. 8 to 10 inclusive pneumatically operated ejector mechanism is provided for freeing the finally formed panel 60 from the lower die 79 after the mold has been opened in the manner shown in Fig. 1. Mounted within a recess 95 in the bottom of the platen 62 is an ejector bar 94. This bar is permitted a limited amount of vertical movement within the recess against the action of a compression spring 96 extending through a hole in the platen 62 into a recess 97 in the die member 79. The ejector bar 94 engages a number of vertically extending pins 98 which are freely slidable within holes in the platen 62. As shown in Fig. 8 the pin 98 engages the head of a knock-out pin 99 which at its upper end engages the head of the locating stud 91. In Fig. 10 the pin 98 engages a longer knock-out pin 102 which in turn contacts the head of the locating stud 91. In the manufacture of the panel 60 which is provided with seven fastener elements and a corresponding number of locating studs 91 I prefer to provide a corresponding number of knock-out pins 99, 102 which are of suitable length to extend a sufficient distance through the die 79 to engage the bottoms of the locating studs 91, these knock-out pins being freely slidable in holes in the die 79 and terminating at their lower ends in heads slidable within annular recesses 100, 103 in the bottom of the die 79. As shown in Figs. 8 and 10 locking pins 101 and 104 project into notches in the heads of the knock-out pins so as to prevent turning thereof and thereby maintain the upper tapered ends of the knock-out pins in smooth engagement with the lower ends of the locating studs 91. From the foregoing, it will therefore be seen that the locating studs 91 which are mounted within the socket members 90, the latter in turn being slidable within recesses in the die 79, are utilized as contact media for the knock-out pins 99 and 102 when the latter are shifted upwardly to free the panel 60 from the die 79. It will be understood that the ejector bar 94 and the recess 95 are shaped so as to engage all of the pins 98 and accordingly the bar 94 has an extended portion 94a, as shown in Fig. 8, enabling engagement thereof with the pin 98 which is arranged out of line with the remaining pins. The ejector bar 94 is shifted vertically to actuate the knock-out pins by a plurality of plungers 105 which are connected to pistons reciprocable within air cylinders arranged within the housings 20 and beneath the platforms 37, the plungers 105 being shiftable vertically through holes in the platforms 37 and the anti-friction roller mechanism mounted thereon.

In order to reduce the time required for the molds and their plastic charges to remain in the press during each cycle of operation I prefer to pre-heat the mold units before they are fed into the press. The mold units are preferably self-contained and provided with devices for locking or clamping the upper and lower platens 61 and 62 tightly together within the press so as to permit them to be withdrawn from the press in order to complete the reaction or polymerization of the plastic material outside the press. In other words, the mold units are preferably withdrawn from the press before completion of the molding operation, the final polymerization or reaction of the plastic material being allowed to proceed to the final stage when the molds are outside the press and in closed condition. This reduces the time cycle during which the molds are in the press and frees the press for operation upon a succeeding pair of mold units which may be introduced into the press as soon as the preceding pair have been withdrawn therefrom. In order to accomplish the foregoing the mold units may be constructed with locking devices and adapted to be locked and unlocked in accordance with my copending application, Serial No. 581,648, filed March 8, 1945, now Patent No. 2,485,452.

From the foregoing it will be seen that four molds and molding shifting mechanisms are arranged at the four sides of the press. The molds 44 and 46 are supported and guided for reciprocating motion at the same levels and in paths located ninety degrees apart. On the other hand the molds 45 and 47 are supported and guided for reciprocating motion at the same levels but in paths ninety degrees apart located at a level below the level of the molds 44 and 46. Thus, when the molds 46 and 47 are shifted into the press the molds 44 and 45 are in retracted positions outside the press for removal of finished articles and re-charging with plastic blanks. After completion of a molding operation the ram 57 descends, thus lowering the platen 28 and relieving the platen 30 of pressure and at this time the molds are withdrawn from the press by operation of the associated air cylinder mechanisms.

It will be apparent that after retraction of one pair of molds the other pair may be shifted into the press with no appreciable loss of time. Molds 44 and 46, which operate on the same level, are shifted successively into positions between the heated platens 26 and 30, see Figs. 3 and 4. Similarly molds 45 and 47, which operate on the same level, are shifted successively into positions between the heated platens 28 and 30. Since the intermediate platen 30 is free to move vertically between the upper fixed platen 26 and the lower reciprocable platen 28 it will be seen that the action of closing the press will result in equal pressures being applied to both superimposed molds within the press.

I claim:

1. A press for use in molding or forming plastic articles, comprising an upright frame open at four sides to permit the introduction of a mold into the press at each of said sides, upper and lower heated platens within said frame, means for reciprocating one of said platens vertically relatively to the other platen, an intermediate heated platen interposed between said first named platens and supported on the frame for free vertical movement, two pairs of means arranged at the four sides of the press for shifting two pairs of molds into and out of the press, each pair of means operating simultaneously to shift two molds at two sides of the press in paths located at different levels so as to dispose one mold between the upper and intermediate platens and the other mold between the intermediate and lower platen.

2. A press for use in molding or forming plastic articles, comprising an upright frame open at two pairs of opposed sides to permit the introduction of a mold into the press at each of said sides, upper and lower heated platens within said frame, means for reciprocating the lower one of said platens vertically relatively to the other platen, an intermediate heated platen interposed between said first named platens and supported on the frame for free vertical movement, two pairs of means arranged at the four sides of the press for shifting two pairs of molds into and out of the press, each pair of means operating simultaneously to shift two molds at two opposite sides of the press in paths located at different levels so as to dispose one mold between the upper and intermediate platens and the other mold between the intermediate and lower platens.

3. A press for use in molding or forming plastic articles, comprising upper and lower heated platens, means for shifting one of said platens vertically relatively to the other platen, an intermediate heated platen interposed between said first platens, means for supporting said intermediate platen for free vertical movement, and means for successively shifting in pairs four molds into and out of positions within the press with one mold of each pair disposed between the upper and intermediate platens and the other mold of each pair disposed between the intermediate and lower platens, said means comprising four mechanisms arranged at four sides of the press.

4. The method of molding articles in molds in a press, including the steps of simultaneously shifting a pair of molds into the press from two sides thereof in paths located at different levels, exerting pressure on said molds through the medium of three spaced platens one arranged between and in engagement with both molds, removing the molds from the press, simultaneously shifting another pair of molds into the press from another two sides thereof in paths located at different levels, exerting pressure on said molds through said platens with one thereof arranged between and in engagement with both molds, and removing said last pair of molds from the press.

5. The method of molding articles in molds in a press having upper and lower relatively vertically movable platens and an intermediate platen freely movable in a vertical direction between said platens, including the steps of shifting two molds from two sides of the press into positions to dispose one mold between the upper and intermediate platens and the other mold between the intermediate and lower platens, relatively moving said platens together to compress the molds, removing the molds from the press, shifting another two molds from another two sides of the press into position to dispose one mold betwen the upper and intermediate platens and the other mold between the intermediate and lower platens, relatively moving said platens together to compress the molds, and removing the molds from the press.

6. The method of molding articles in molds in a press, including the steps of simultaneously shifting a pair of molds toward each other into the press from opposite sides thereof at different levels, exerting pressure on said molds, withdrawing the molds to their respective opposite sides of the press, simultaneously shifting another pair of molds toward each other into the press from another two opposite sides thereof at different levels, exerting pressure on said molds, and withdrawing said last pairs of molds to their respective oposite sides of the press.

7. The method of molding articles in molds in a press, including the steps of simultaneously shifting a pair of molds toward each other into the press from opposite sides thereof in paths located at different levels, exerting pressure on said molds through the medium of three spaced platens, one arranged between and in engagement with both molds, removing the molds from the press, simultaneously shifting another pair of molds toward each other into the press from another two opposite sides thereof in paths located at said levels, exerting pressure on said molds through said platens, and removing said last pair of molds from the press.

8. A press for use in molding or forming plastic articles, comprising an upright frame open at four sides to permit the introduction of a mold into the press at each of said sides, upper and lower platens within said frame, means for reciprocating one of said platens vertically relatively to the other platen, an intermediate vertically movable platen interposed between said first named platens, means for supporting said intermediate platen from one of said first named platens at points disposed out of the paths of movement of the molds introduced into the press at the four sides thereof, means for simultaneously shifting a pair of molds at different levels into and out of the press from two different sides thereof, means for simultaneously shifting a second pair of molds at said levels into and out of the press from another two sides thereof, one mold of each pair being disposed between the upper and intermediate platens and one mold of each pair being disposed between the intermediate and lower platens.

9. In an apparatus for use in molding or forming plastic articles, two pairs of molds, an upright press frame open at four sides to permit the introduction of a mold into the press frame at each of said sides, an upper fixed platen and a lower vertically movable platen carried by said frame, means for reciprocating the lower platen vertically relatively to the upper platen, an intermediate vertically movable platen interposed between said first named platens, means for suspending said intermediate platen from the upper platen at points located out of the paths of travel of the molds when introduced at the four sides of said frame, means for simultaneously shifting a pair of said molds at different levels into and out of the frame from two different sides thereof, means for simultaneously shifting a second pair of said molds at said levels into and out of the frame from another two sides thereof, one mold of each pair being shifted into position between the upper and intermediate platens and the other mold of each pair being shifted into position between the intermediate and lower platens.

10. In an apparatus for use in molding or forming plastic articles, two pairs of molds, an upright press frame open at four sides to permit the introduction of a mold into the press frame at each of said sides, means for supporting a mold at each of said sides, upper and lower heated platens carried by said frame, means for reciprocating one of said platens vertically relatively to the other platen, an intermediate platen interposed between said first named platens and supported on the frame for free vertical movement, means for simultaneously shifting a pair of said molds at different levels into and out of the press frame from two different sides thereof, means for simultaneously shifting a second pair of said molds at said levels into and out of the press frame from another two sides thereof, one mold of each pair being shifted into position between the upper and intermediate platens and the other mold of each pair being shifted into position between the intermediate and lower platens.

FRED LYIJYNEN.

REFERENCES CITED

The following references are of record in the file of this patent:

UNITED STATES PATENTS

| Number | Name | Date |
| --- | --- | --- |
| 1,332,963 | Tucker et al. | Mar. 9, 1920 |
| 1,607,073 | Gros | Nov. 16, 1926 |
| 1,775,812 | Church | Sept. 16, 1930 |
| 1,800,849 | Stacy | Apr. 14, 1931 |
| 1,992,314 | Laussucq | Feb. 26, 1935 |
| 2,013,587 | Stacy | Sept. 3, 1935 |
| 2,138,047 | Turner | Nov. 29, 1938 |
| 2,171,511 | Winegar et al. | Aug. 29, 1939 |
| 2,239,248 | Rieser | Apr. 22, 1941 |
| 2,317,440 | Cannon | Apr. 27, 1943 |